United States Patent [19]

Wichmann

[11] E Patent Number: Re. 33,225

[45] Reissued Date of Patent: May 29, 1990

[54] METHOD FOR MATING TELEVISION CRT CATHODE COMPONENTS

[75] Inventor: Janice L. Wichmann, Park Ridge, Ill.

[73] Assignee: Zenith Electronics Corporation, Glenview, Ill.

[21] Appl. No.: 360,954

[22] Filed: Jun. 2, 1989

Related U.S. Patent Documents

Reissue of:

[64] Patent No.: 4,250,602
Issued: Feb. 17, 1981
Appl. No.: 65,,481
Filed: Aug. 10, 1979

U.S. Applications:

[63] Continuation-in-part of Ser. No. 35,885, Apr. 4, 1979, abandoned.

[51] Int. Cl.[5] ..... H01J 9/02
[52] U.S. Cl. ..... 445/36; 29/821
[58] Field of Search ..... 29/821, DIG. 46; 445/36

[56] References Cited

U.S. PATENT DOCUMENTS

| | | | |
|---|---|---|---|
| 2,768,431 | 10/1956 | Hughes | 29/821 X |
| 3,241,222 | 3/1966 | Timmermans | 29/821 X |
| 3,468,024 | 9/1969 | Yonkers | 29/821 X |
| 3,849,873 | 11/1974 | Coffin | 29/821 X |

*Primary Examiner*—Kenneth J. Ramsey

[57] ABSTRACT

A method is disclosed for mating the tubular cap and tubular shank of the cathode assembly used in TV CRT electron guns. The shank has an end larger in diameter than the cap, and a narrow end adapted to fit into the cap. The method comprises causing the cap to fall open-end-down into a first receptacle. The first receptacle is inverted in conjunctive alignment with a second receptacle, causing the cap to fall open-end-up into the second receptacle. The shank is then caused to fall narrow-end-down into the second receptacle and into the cap; the second receptacle is adapted to reject the larger end of the shank. The second receptacle is inverted in conjunctive alignment with the first receptacle, causing the mated cap and shank to fall shank-end-down into the first receptacle where it is held cap-side-up for further processing.

1 Claim, 1 Drawing Sheet

METHOD FOR MATING TELEVISION CRT CATHODE COMPONENTS

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation-in-part of application Ser. No. 035,885 filed Apr. 4, 1979, (now abandoned) of common ownership herewith.

BACKGROUND OF THE INVENTION

This invention relates to thermally activated electron-emissive cathodes for electron guns used in television cathode ray picture tubes, and in particular to an improved method of assembling certain components of such cathodes.

As is well-known in the art, the cathode assembly comprises two basic parts as shown by FIG. 1. One part of the cathode assembly 10 is a tubular cap 12 in the form of a straight-sided cup on the closed end of which is subsequently applied a thin, thermally activated electron-emissive coating 14. The second part is the tubular shank 16 which is an open-ended hollow tube having an end 18 larger in diameter than the cap and as shown by FIG. 1, a narrow end 20 adapted to fit into the cup formed by cap 12. The electron-emissive coating 14 deposited on the cap 12 is caused to emit electrons by the heat produced by a pair of electrically energized filament wires 22 extending into the shank 16 and the cap 12.

Hand-assembly of the two basic parts presents a problem in manufacture because of the very small size of the parts. For example, the length of the shank 16 is 0.320 inch and the length of the cap 12 is 0.110 inch. The outside diameter of the first or larger end 18 of the shank 16 is 0.1 inch, and the outside diameter of the narrow, or distal end, is 0.075 inch. The outside diameter of the cap 12 is 0.086 inch. It will be seen that assembly of large quantities of such small parts by hand is very labor-intensive and production rates are necessarily low. Also, the parts are fragile and can easily be damaged by hand assembly.

Accordingly, the objective of the invention is to provide a method for mating the basic two parts of the cathode assembly 10 that substantially eliminates hand assembly while greatly increasing the rate of assembly and reducing rejects.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, of the several figures of which like reference numerals identify like elements, and in which:

DESCRIPTION OF THE PREFERRED EMBODIMENT

The method according to the invention for mating production quantities of the tubular caps and shanks of the cathode assemblies of TV CRT electron guns comprises the following.

Figure 1:
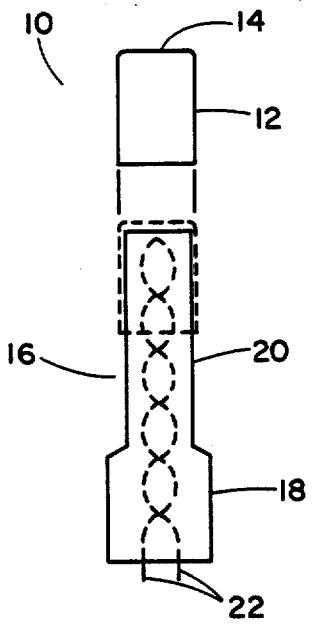
Fig. 1 PRIOR ART
FIG. 1 is an exploded view in elevation of a prior art cathode assembly, greatly enlarged.
Figure 2:
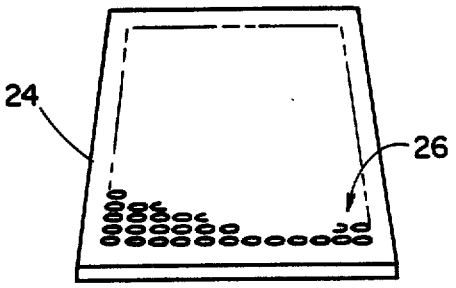
FIG. 2 is a view in perspective of a shaker plate component used in the method according to the invention.
Figure 2A:
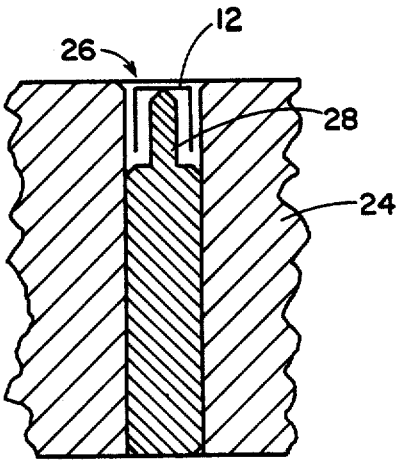
FIGS. 2A, 3 and 4 are detailed views in cross section of components and parts assembled by the method according to the invention.

A quantity of caps 12 are deposited onto a first shaker plate 24 (please refer to FIG. 2) having a plurality of receptacles 26, adapted to receive the caps 12 open-end-down. The causing of the caps 12 to fall open-end-down into the receptacles 26, is effectuated by positioning in each receptacle 26, a pin 28 (please refer to FIG. 2A) smaller than the opening in the cap 12, and concentric with the axis of the receptacle 26. The pin 28 is thus effective to prevent the closed-end-down entry of the caps 12 into the receptacles 26. This entry is indicated by FIG. 2A wherein cap 12 is shown as being deposited in receptacle 26.

The first shaker plate 24, is shaken to cause the caps 12 to fall open-end-down into the receptacles 26, and any excess of the caps is removed. A second shaker plate (not shown) similar in dimensions to first shaker plate 24 is positioned contiguous to the first shaker plate. The second shaker plate has receptacles matching in number, location and alignment of the receptacles in the first shaker plate; a typical receptacle 30 is shown by the detail view, FIG. 3. The plates are inverted in conjunctive alignment, causing the caps 12 to fall open-end-up into the receptacles 30 of the second shaker plate, after which the first shaker plate 24 is removed.

Figure 3:
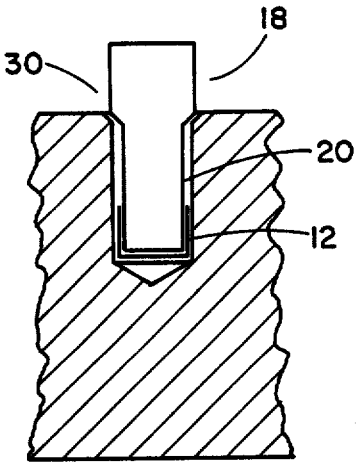

A quantity of shanks 16 are then deposited onto the second shaker plate and the plate is shaken, causing the shanks 16 to fall narrow-end-down into the receptacles 30 and into the caps 12, after which any excess of shanks is removed. The receptacles 30 of the second shaker plate are adapted to reject the larger ends 18 of the shanks 16 by virtue of being smaller in diameter than the larger end of the shanks. The entry of the narrow end 20 of shank 16 into hole 30 and into cap 12, the the rejection of larger end 18, is indicated by FIG. 3.

The first and second shaker plates are repositioned and inverted, causing the mated cap-and-shank assemblies to fall shank-end-down into the receptacles 26 of the first shaker plate 24, after which the second shaker plate is removed.

Figure 4:
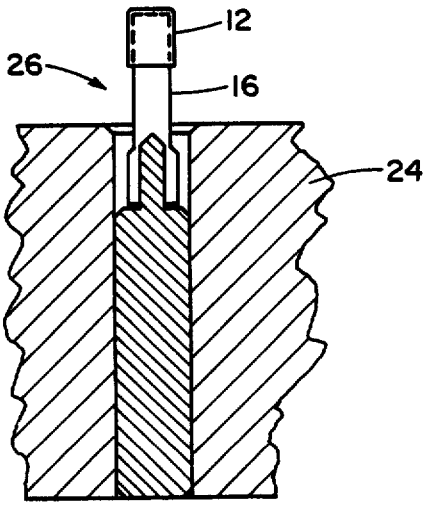

As a consequence of the method and as indicated by FIG. 4, the first shaker plate 24 holds the cathode assemblies caps-end-up for further processing, which may for example comprise attachment of the caps 12 and shanks 16 as by welding.

Ways to make suitable shaker plates will be readily apparent to those having ordinary skill in the art. However, to facilitate manufacture of the plates, the following information based upon production-proved components is provided.

The first shaker plate 24 may comprise, for example, a hard-coat, color-clear aluminum plate 8 inches square and 0.625 inch thick. A grid made up of four hundred receptacles 26 0.343 inch apart and 0.125 inch in diameter provide for receiving four hundred caps 12. The openings are chamfered to facilitate entry of the caps into the receptacles 26. Each receptacle 26 is about 0.16 inch deep, and the pin 28 positioned therein is 0.047 inch in diameter and preferably comes to a point, as shown by FIG. 2A.

The second shaker plate is preferably made of the same material as the first plate and is similar in dimensions. The receptacles 30 of the second shaker plate match those of the first plate in number, location and alignment. Each receptacle 30 is 0.093 inch in diameter and 0.250 inch deep, and the openings are chamfered to facilitate entry of the narrow end of the shank into the receptacle, as shown by FIG. 3.

Positioning of the two shaker plates in contiguity is provided by a plurality of peripherally located alignment pins (not shown), a technique well known in the art. Shaking of the plates can be accomplished by machinery that is also well known in the art.

The mating of the 400 caps and 400 shanks by the method according to the invention requires only about five minutes of time, with a near-zero reject level. Assembly of 400 caps and 400 shanks by hand requires about seventy minutes and the rejects attributable to damage in handling are numerous.

It must be recognized that changes may be made in the above-described method without departure from the true spirit and scope of the invention herein involved, and it is intended that the subject matter in the foregoing to be interpreted as illustrative and not in a limiting sense.

I claim:

1. A method for mating production quantities of the tubular caps and shanks of the cathode assemblies of the TV CRT electron guns, each of said shanks having a base end larger in outside diameter than said cap, and a narrow end adapted to fit into said cap, the method comprising:

depositing a quantity of said caps onto a first shaker plate having a plurality of receptacles adapted to receive said caps open-end-down, by positioning in each receptacle a pin smaller in diameter than the opening in said caps and concentric with the axis of the said receptacle, said pin being effective to prevent the closed-end-down entry of said caps into said receptacle;

shaking said first shaker plate to cause said caps to fall open-end-down into said receptacles, and removing any excess of said caps;

positioning contiguous to said first shaker plate a second shaker plate having receptacles matching in number, location and alignment the receptacles of said first shaker plate, and inverting said plates in conjunctive alignment, causing said caps to fall open-end-up into the receptacles of said second shaker plate;

removing said first shaker plate and depositing a quantity of said shanks onto said second shaker plate and shaking said second shaker plate, causing said shanks to fall narrow-end-down into said receptacles and into said caps, said receptacles being adapted to reject the larger end of said shanks by virtue of being smaller in diameter than the larger end of said shanks;

removing any excess of said shanks;

repositioning and inverting said first and second shaker plates, causing the mated cap-and-shank assemblies to fall shank-end-down into said receptacles and onto said pins of said first shaker plate, and removing said second shaker plate, said first shaker plate holding said assemblies cap-end-up for further processing.

* * * * *